(12) United States Patent
McMillen

(10) Patent No.: US 6,652,028 B2
(45) Date of Patent: Nov. 25, 2003

(54) APPARATUS AND METHOD FOR LUMBAR SUPPORT WITH VARIABLE APEX

(75) Inventor: Robert McMillen, Tecumseh (CA)

(73) Assignee: L & P Property Management, South Gate, CA (US)

( * ) Notice: Subject to any disclaimer, the term of this patent is extended or adjusted under 35 U.S.C. 154(b) by 0 days.

(21) Appl. No.: 10/003,803

(22) Filed: Nov. 2, 2001

(65) Prior Publication Data

US 2003/0085599 A1 May 8, 2003

(51) Int. Cl.$^7$ ............................................. A47C 3/025
(52) U.S. Cl. ................................................. 297/284.4
(58) Field of Search .......................... 297/284.4, 284.1, 297/284.7

(56) References Cited

U.S. PATENT DOCUMENTS

| | | | |
|---|---|---|---|
| 1,182,854 A | 5/1916 | Poler | |
| 2,756,809 A | 7/1956 | Endresen | 155/182 |
| 2,843,195 A | 7/1958 | Barvaeus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,724,144 A | 4/1973 | Schuster | 52/108 |
| 3,762,769 A | 10/1973 | Poschl | 297/284 |
| 4,014,422 A | 3/1977 | Morishita | 192/67 |
| 4,136,577 A | 1/1979 | Borgersen | 74/479 |
| 4,153,293 A | 5/1979 | Sheldon | 297/284 |
| 4,156,544 A | 5/1979 | Swenson et al. | 297/284 |
| 4,182,533 A | 1/1980 | Arndt et al. | 297/284 |

(List continued on next page.)

FOREIGN PATENT DOCUMENTS

| | | | |
|---|---|---|---|
| AT | 401 497 | 9/1996 | B60N/2/22 |
| DE | 2040794 | 7/1971 | A47C/7/28 |
| DE | 206 4419 | 7/1972 | B60N/1/06 |
| DE | 29 47 472 | 8/1980 | B60N/1/00 |
| EP | 0 006 840 B1 | 2/1982 | A47C/23/00 |
| EP | 0 169 293 B1 | 10/1988 | A47C/7/46 |
| EP | 0 322 535 A1 | 7/1989 | A47C/7/46 |
| EP | 0 485 483 B1 | 1/1994 | A47C/7/46 |
| EP | 0 434 660 B1 | 5/1995 | A47C/7/46 |
| EP | 0 540 481 B1 | 12/1995 | A47C/7/46 |
| EP | 0 662 795 B1 | 12/1996 | A47C/7/46 |
| EP | 0 702 522 B1 | 3/1997 | A47C/7/46 |
| EP | 0 696 251 B1 | 7/1997 | B60N/2/44 |
| EP | 0 746 219 B1 | 11/1998 | A47C/7/46 |
| EP | 0 797 399 B1 | 11/1998 | A47C/7/46 |
| EP | 0 698 360 B1 | 3/2000 | A47C/7/46 |
| FR | 2 596 334 | 10/1987 | B60N/1/06 |
| GB | 1 423 617 | 2/1976 | A47C/7/46 |
| GB | 2 013 487 | 2/1978 | A47C/7/46 |
| RU | 587924 | 2/1978 | A47C/7/46 |
| WO | WO/00/00064 | 1/2000 | A47C/3/025 |

*Primary Examiner*—Milton Nelson, Jr.
(74) *Attorney, Agent, or Firm*—Robert C. Haldiman, Esq.; Grant D. Kang, Esq.; Husch & Eppenberger, LLC

(57) ABSTRACT

A lumbar support to be installed in a seat has an apex that varies vertically along a guide rail. The guide rail has an upper stop and a lower stop. A bowing element disposed on the guide rail travels in a substantially vertical plane. A first bowden cable draws an upper of the bowing element downward until a lower portion of the bowing element is in abutment with the lower stop such that a low convexity is formed in the bowing element as the bowden cable continues to draw the upper portion of said bowing element further towards the lower stop. A second bowden cable draws a lower portion of the bowing element upward until the upper portion of the bowing element is in abutment with the upper stop and such that a high convexity is formed in the bowing element as the bowing element continues to draw said lower portion of the bowing element further towards the upper stop.

15 Claims, 15 Drawing Sheets

U.S. PATENT DOCUMENTS

| | | | |
|---|---|---|---|
| 4,295,681 A | 10/1981 | Gregory | 297/284 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,390,210 A | 6/1983 | Wisniewski et al. | 297/452 |
| 4,449,751 A | 5/1984 | Murphy et al. | 297/284 |
| 4,452,485 A | 6/1984 | Schuster | 297/284 |
| 4,465,317 A | 8/1984 | Schwarz | 297/284 |
| 4,494,709 A | 1/1985 | Takada | 242/107.6 |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,561,606 A | 12/1985 | Sakakibara et al. | 242/107 |
| 4,564,235 A | 1/1986 | Hatsutta et al. | 297/284 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,627,661 A | 12/1986 | Ronnhult et al. | 297/284 |
| 4,632,454 A | 12/1986 | Naert | 297/284 |
| 4,676,550 A | 6/1987 | Neve De Mevergnies | 297/353 |
| 4,679,848 A | 7/1987 | Spierings | 297/284 |
| 4,730,871 A | 3/1988 | Sheldon | 297/230 |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 5,005,904 A | 4/1991 | Clemens et al. | 297/284 |
| 5,022,709 A | 6/1991 | Marchino | 297/452 |
| 5,026,116 A | 6/1991 | Dal Monte | 297/284 |
| 5,050,930 A | 9/1991 | Schuster et al. | 257/284 |
| 5,076,643 A | 12/1991 | Colasanti et al. | 297/284 |
| 5,088,790 A | 2/1992 | Wainwright et al. | 297/284 |
| 5,137,329 A | 8/1992 | Neale | 297/284 |
| 5,174,526 A | 12/1992 | Kanigowski | 244/122 |
| 5,186,412 A | 2/1993 | Park | 242/245 |
| 5,197,780 A | 3/1993 | Coughlin | 297/284.7 |
| 5,215,350 A | 6/1993 | Kato | 297/284.4 |
| 5,217,278 A | 6/1993 | Harrison et al. | 297/284.7 |
| 5,286,087 A | 2/1994 | Elton | 297/284.7 |
| 5,299,851 A | 4/1994 | Lin | 297/284.5 |
| 5,335,965 A | 8/1994 | Sessini | 297/284.4 |
| 5,385,531 A | 1/1995 | Jover | 601/99 |
| 5,397,164 A | 3/1995 | Schuster | 297/284.1 |
| 5,423,593 A | 6/1995 | Nagashima | 297/284.5 |
| 5,449,219 A | 9/1995 | Hay et al. | 297/284.4 |
| 5,452,868 A | 9/1995 | Kanigowski | 244/122 R |
| 5,474,358 A | 12/1995 | Maeyaert | 297/284.7 |
| 5,498,063 A | 3/1996 | Schuster et al. | 297/284.1 |
| 5,518,294 A | 5/1996 | Ligon, Sr. et al. | 297/284.4 |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,588,703 A | 12/1996 | Itou | 297/284.4 |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,704,687 A | 1/1998 | Klingler | 297/284.4 |
| 5,718,476 A | 2/1998 | De Pascal et al. | 297/284.4 |
| 5,758,925 A | 6/1998 | Schrewe et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A | 8/1998 | van Hekken et al. | 297/284.4 |
| 5,816,653 A | 10/1998 | Benson | 297/284.4 |
| 5,823,620 A | 10/1998 | Le Caz | 297/284.4 |
| 5,857,743 A | 1/1999 | Ligon, Sr. et al. | 297/284.9 |
| 5,868,466 A | 2/1999 | Massara et al. | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |
| 6,036,265 A | 3/2000 | Cosentino | 297/284.4 |
| 6,045,185 A | 4/2000 | Ligon, Sr. et al. | 297/284.4 |
| 6,050,641 A | 4/2000 | Benson | 297/284.4 |
| 6,079,783 A | 6/2000 | Schuster, Sr. et al. | 297/284.1 |
| 6,092,871 A | 7/2000 | Beaulieu | 297/284.4 |
| 6,152,531 A | 11/2000 | Deceuninck | 297/284.4 |
| 6,152,532 A | 11/2000 | Cosentino | 297/284.4 |
| 6,158,300 A | 12/2000 | Klingler | 74/526 |
| 6,227,617 B1 | 5/2001 | von Möller | 297/284.4 |
| 6,227,618 B1 | 5/2001 | Ligon, Sr. et al. | 297/284.4 |
| 6,254,186 B1 | 7/2001 | Falzon | 297/284 |
| 6,254,187 B1 | 7/2001 | Schuster, Sr. et al. | 297/284.1 |
| 6,270,158 B1 | 8/2001 | Hong | 297/284.4 |
| 6,296,308 B1 | 10/2001 | Cosentino et al. | 297/284.4 |
| 6,334,651 B1 | 1/2002 | Duan et al. | 297/284.4 |
| 6,338,530 B1 * | 1/2002 | Gowing | |
| 6,536,840 B1 * | 3/2003 | Schuster, Sr. et al. | |

* cited by examiner

APPARATUS AND METHOD FOR LUMBAR SUPPORT WITH VARIABLE APEX

CROSS-REFERENCES TO RELATED APPLICATIONS

None.

STATEMENT REGARDING FEDERALLY SPONSORED RESEARCH

None.

BACKGROUND OF THE INVENTION

1. Technical Field

The method and apparatus of the present invention is in the field of lumbar supports having arched apexes that can be varied in height.

2. Prior Art

Lumbar supports that have archable pressure surfaces actuated by traction cables are known. Typically a flexible pressure surface is mounted on guide rails with a bowden cable sleeve attached to one end of the pressure surface and the bowden cable wire attached to the other end. Traction drawing the wire into the sleeve draws the two ends of the flexible surface together arching it towards a seat occupant. These simple devices are unable to raise or lower the apex of the arch created in a significant or controllable manner.

Lumbar supports with arching pressure surfaces that can move the apes of the arch vertically are expensive, complex and bulky. Typically the vertical movement (and usually the arching movement as well) are actuated by electric motors, as in U.S. Pat. No. 5,050,930 to Schuster, et al. and U.S. Pat. No. 5,609,394 to Ligon, Sr. et al. The ability of these units to customize the vertical alignment of an apex arch to an individual users preference are desirable in the market place. However, the size of these units limits the ability to install other devices, such as duct work, in a seat, their complexity decreases their durability and their expense limits their marketability to luxury vehicles.

There is a need in the art for a simple, durable, compact and inexpensive lumbar support capable of varying the apex of it's arch vertically.

SUMMARY OF THE INVENTION

The present invention is a lumbar support that has an archable pressure surface with a vertically variable apex. A flexible, archable pressure surface has a top end and a bottom end, each of which are slidingly mounted on a pair of guide rails. The guide rails have end stops which prevent the archable pressure surface to slide beyond the stops. When the archable pressure surface is flat, the distance between the sliding ends of the archable pressure surface is substantially equal to the distance between the guide rail end stops.

However, when the pressure surface is arched, the distance between the sliding ends of the pressure surface is shorter than the distance between the guide rail end stops. The present invention takes advantage of this gap between an arched pressure surface and the guide rail stops in order to move the arched pressure surface, and it's apex, up and down.

The guide rails have a mounting bracket which does not move that is substantially half way between the guide rail end stops. The present invention is capable of arching it's pressure surface with not one, but either of two bowden cables used to apply the traction that draws the pressure surface top and bottom ends towards one another.

A top bowden cable has it's sleeve anchored at the pressure surface top end and it's axial sliding wire anchored at the center bracket. A second, bottom bowden cable has it's sleeve anchored to the bottom of the archable pressure surface and it's sliding axial wire anchored to the central mounting bracket. Traction drawing the bowden cable wire into the bowden cable sleeve on either of these bowden cables will shorten the distance between the top and bottom ends of the pressure surface, bowing it outwards and creating an arch.

If traction is applied to the top bowden cable, the bowden cable sleeve end draws the top of the archable pressure surface downwards towards the central bracket. This also draws the opposing bottom of the archable pressure surface downwards, where it is stopped by the bottom guide rail stop. Continuing traction draws the pressure surface top end closer to the stopped pressure surface bottom end, causing it to flex outwards. Conversely, traction on the bottom bowden cable draws the bottom of the archable pressure surface towards where the bottom bowden cable wire is mounted on the central bracket. The top of the archable pressure surface is stopped by the top guide rail stop and continuing pressure on the bottom bowden cable pinches the archable pressure surface between the bottom bowden cable sleeve and the top guide rail stop, again flexing the archable pressure surface.

The dimensions of the arch created by these motions is the same if either the top or bottom bowden cable are used to create it. If the top bowden cable is used to create the arch, the arch will be butting the bottom guide rail stop, and if the bottom bowden cable is used the arch will abutting the top guide rail stop. Accordingly, selecting the bowden cable used selects whether the arch is created in a upper-most position or a lower-most position. These positions are separated by several inches.

Tractive forces applied to both bowden cables through a single actuator. The ends of each bowden cable that are not attached to the archable pressure surface are attached to a wheel in the rotating actuator. Rotation of the wheel in one direction applies traction to one bowden cable, and rotation of the wheel in the opposite direction applies traction to the other bowden cable. Thus, at one extreme rotation of the actuator wheel, the pressure surface is fully flexed, fully drawn to the top end of the guide rail and maintains an apex in the top position. Full rotation of the actuator wheel in the opposite rotational direction forms the pressure surface arch on the opposite end of the guide rail. Travel from one actuator wheel extreme through a half-way point and to the other actuator wheel extreme reduces tractive force on one cable, moves through a half-way point where there is no tractive force on either cable and then applies an opposite tractive force on the opposite bowden cable. When the actuator wheel travels through the half-way point where there is no traction on either cable, the archable pressure surface is flat.

Further features and advantages of the present invention, as well as the structure and operation of various embodiments of the present invention, are described in detail below with reference to the accompanying drawings.

DETAILED DESCRIPTION OF THE INVENTION

Figure 1:
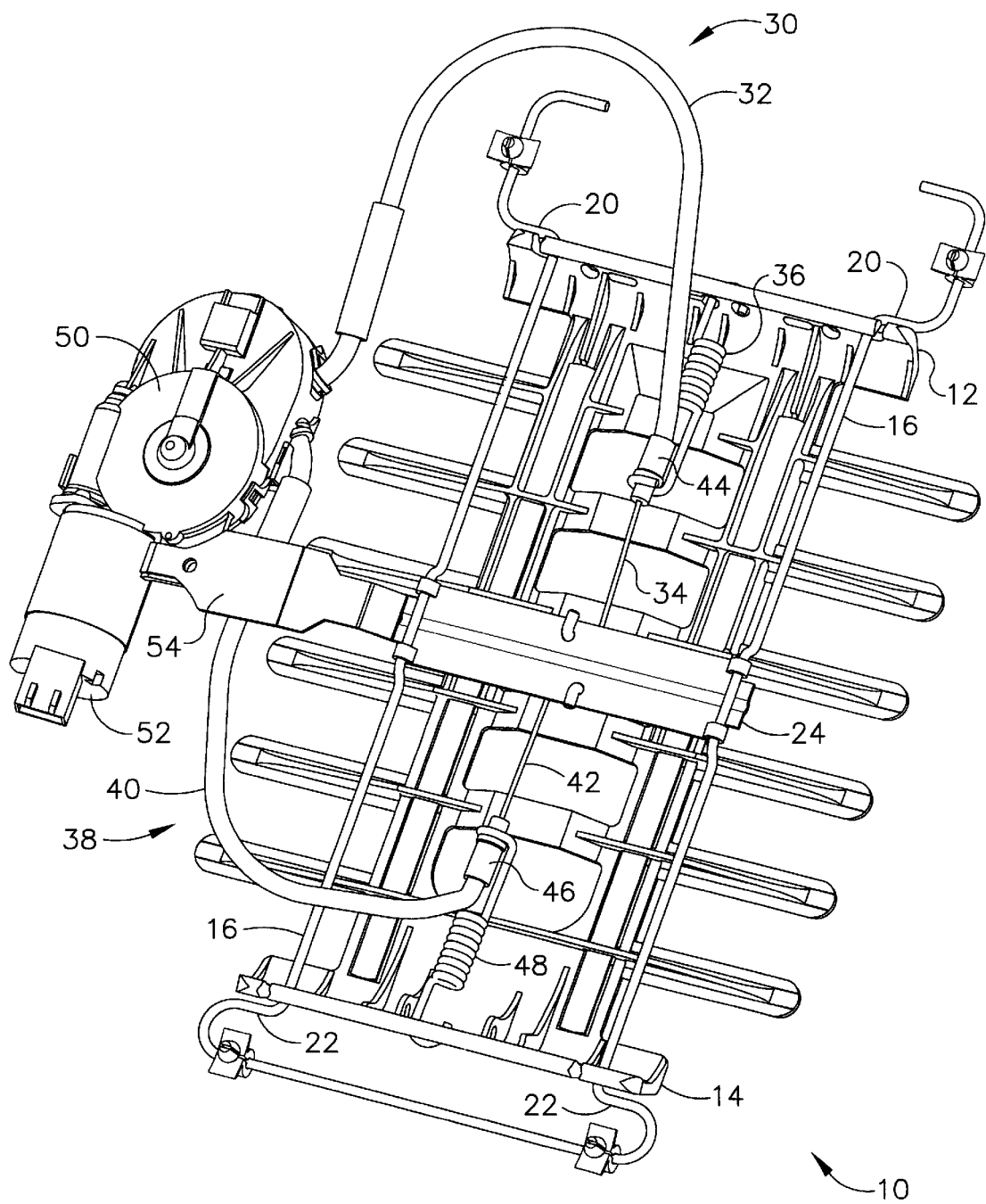
FIG. 1 is a perspective view of the lumbar support of the present invention viewed from the rear, in the flat position.

FIG. 1 is a rear perspective view of the lumbar support of the present invention. A flexible, archable pressure surface, 10, has a top end, 12, and a bottom end, 14, each of which are mounted to slide on a pair of guide rails, 16. In the depicted alternative embodiment, guide rails, 16, are a single wire fabricated in a generally U-shaped fashion to provide two lengths of wire, 16, that guide arching pressure surface, 10. The guide rails have top end stops, 20, and bottom end stops, 22, which prevent the archable pressure surface, 10, from sliding beyond the stops. The archable pressure surface is metal or plastic. It is biased towards remaining flat. This internal bias is weak enough to be overcome by a traction cable such as a bowden cable.

When the archable pressure surface, 10, is flat, the distance between the sliding ends, 12 and 14, of the archable pressure surface, 10, is substantially equal to the distance between the guide rail end stops, 20 and 22. However, when the pressure surface is arched, the distance between the sliding ends, 12 and 14, of the pressure surface is shorter than the distance between the guide rail end stops, 20 and 22. The present invention takes advantage of this gap between an arched pressure surface, 10, and the guide rail stops, 20 and 22, in order to move the arched pressure surface, and it's apex, up and down.

The guide rails have a center mounting bracket, 24, which does not move. The mounting bracket, 24, is substantially half way between the guide rail end stops, 20 and 22. Alternative, non-centered mounts may be used to the same effect. Two bowden cables are used to apply the traction that draws the pressure surface top, 12, and bottom ends, 14, towards one another.

A top bowden cable, 30, has it's sleeve, 32, anchored at the pressure surface top end, 12, and it's axial sliding wire, 34, anchored at the center bracket, 24. In the depicted alternative embodiment, top bowden cable sleeve, 32, is attached to the archable pressure surface top end, 12, via spring, 36. Spring, 36, mediates tension between bowden cable sleeve, 32, and arching pressure surface top end, 12, and helps the unit tolerate abusive loads. A second, bottom bowden cable, 38, has it's sleeve, 40, anchored to the bottom, 14, of the archable pressure surface, 10, and it's sliding axial wire, 42, anchored to the central mounting bracket, 24. Traction drawing the bowden cable wires into the bowden cable sleeves on either of these bowden cables will shorten the distance between the top and bottom ends, 12 and 14, of the arching pressure surface, 10, bowing it outwards and creating an arch.

Figure 11:
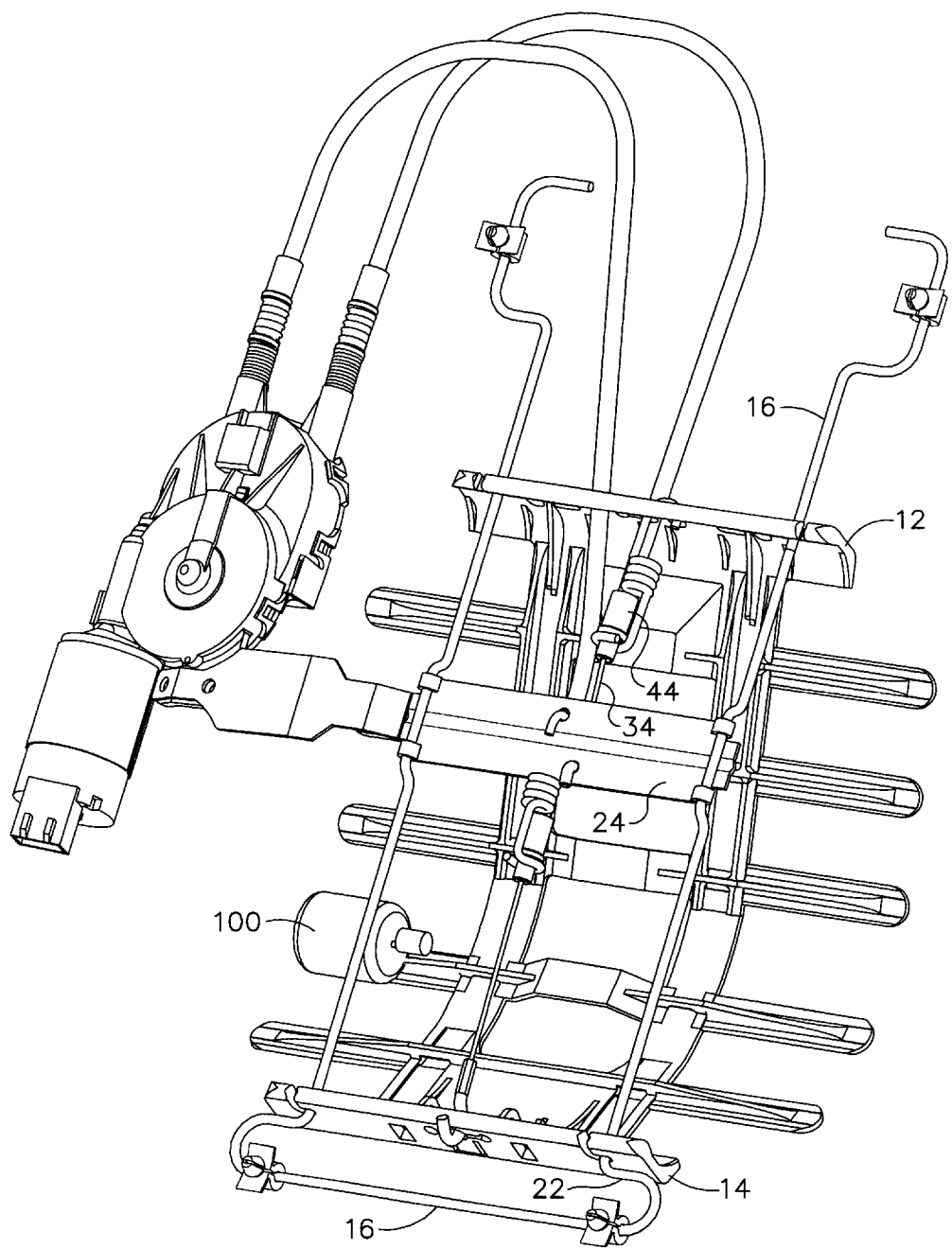
FIG. 11 is a perspective view of an alternative embodiment of the present invention, from the rear, in its low arch position.
Figure 12:
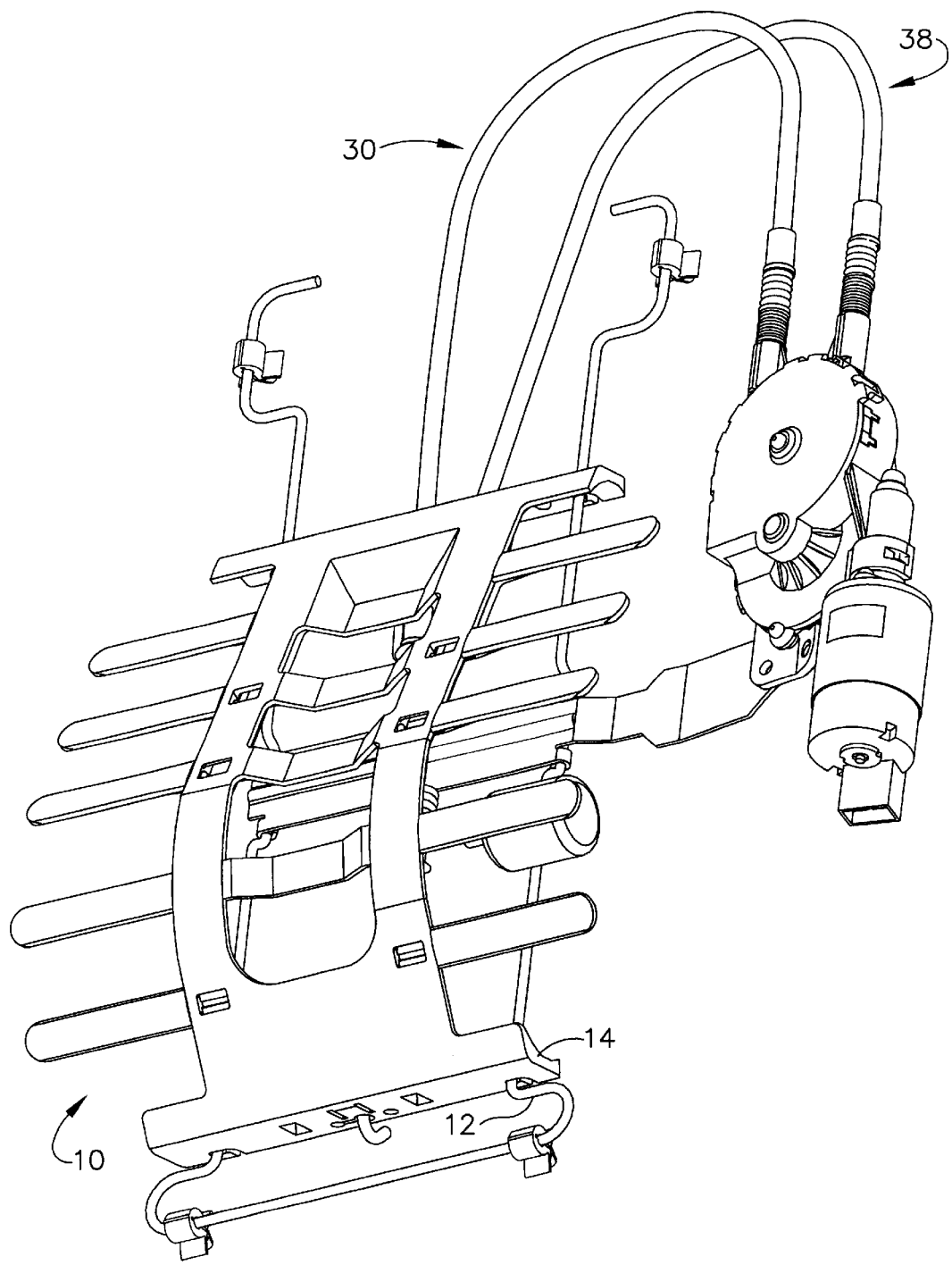
FIG. 12 is a perspective view of an alternative embodiment of the present invention, from the front, in its low arch position.
Figure 13:
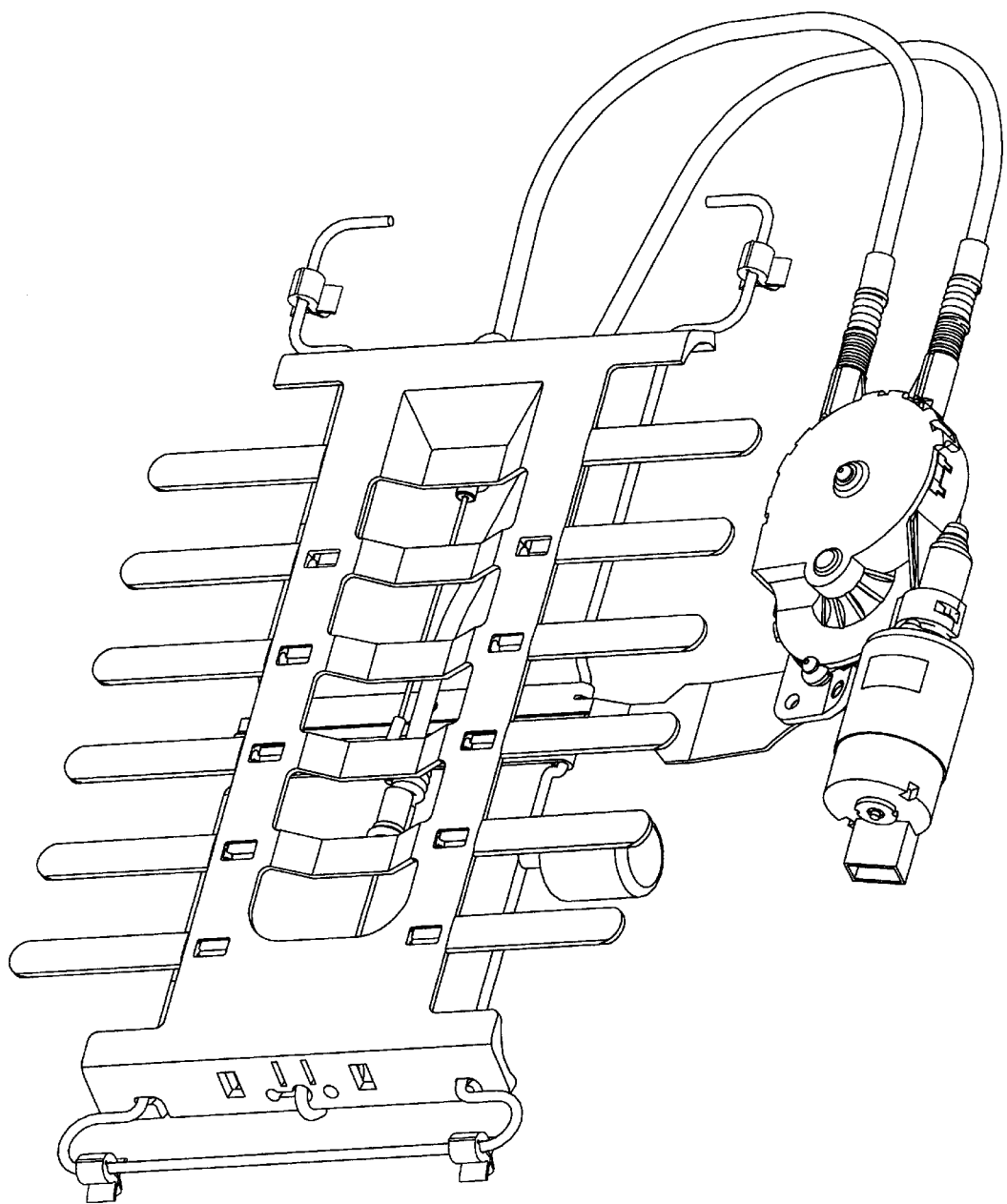
FIG. 13 is a perspective view of an alternative embodiment of the present invention, from the front, in its flat position.

If traction is applied to the top bowden cable, 30, the bowden cable sleeve end, 44, draws the top, 12, of the archable pressure surface downwards towards the central bracket, 24, via spring, 36. This also draws the opposing bottom, 14, of the archable pressure surface downwards, where it is stopped by the bottom guide rail stop, 22. Continuing traction draws the pressure surface top end, 12, closer to the stopped pressure surface bottom end, 14, causing the arching pressure surface, 10, to flex outwards. This low arch position is shown in FIGS. 11 and 12, which also depict alternative bowden cable attachments.

Figure 14:
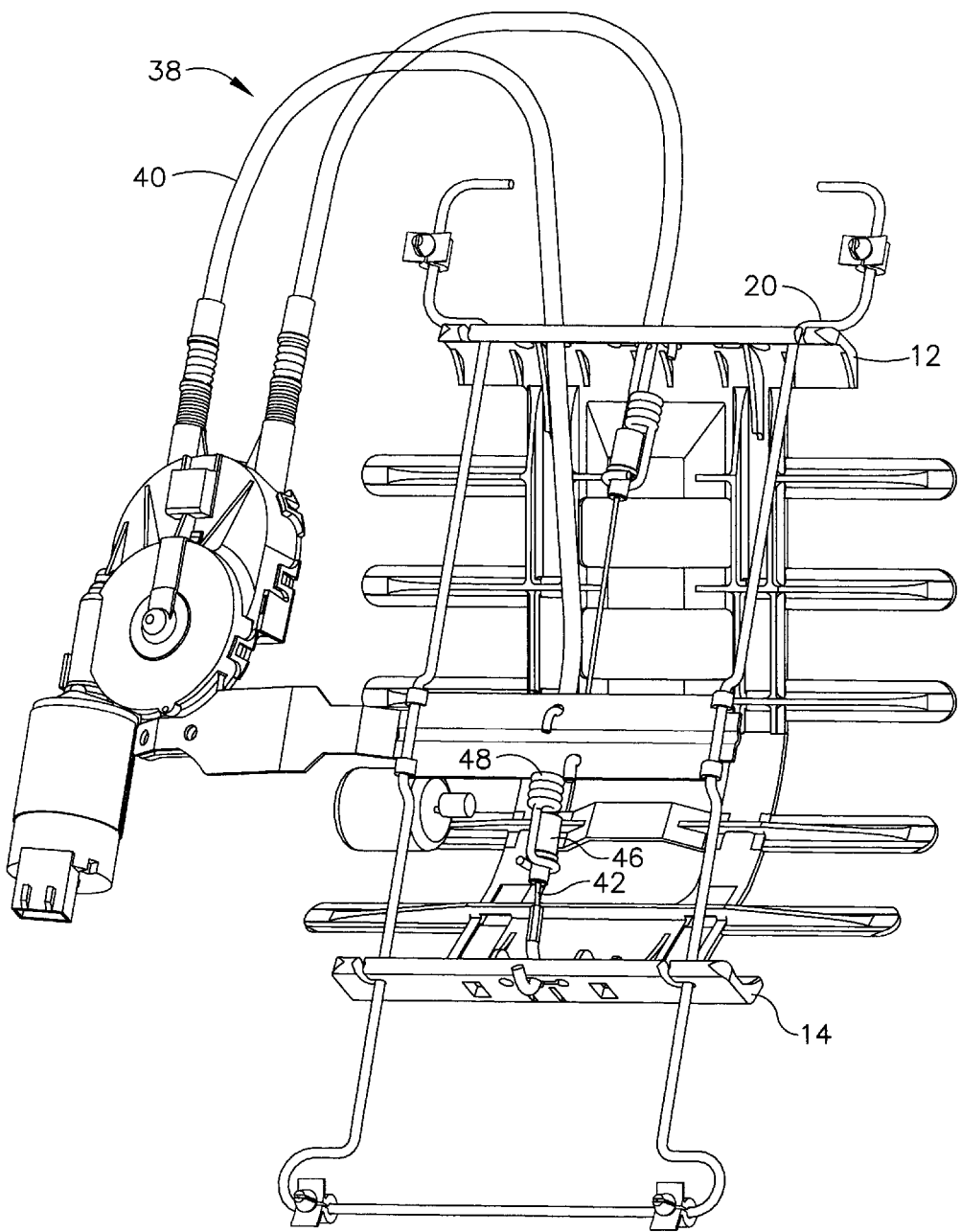
FIG. 14 is a perspective view of an alternative embodiment of the present invention, from the rear, in its high arch position.
Figure 15:
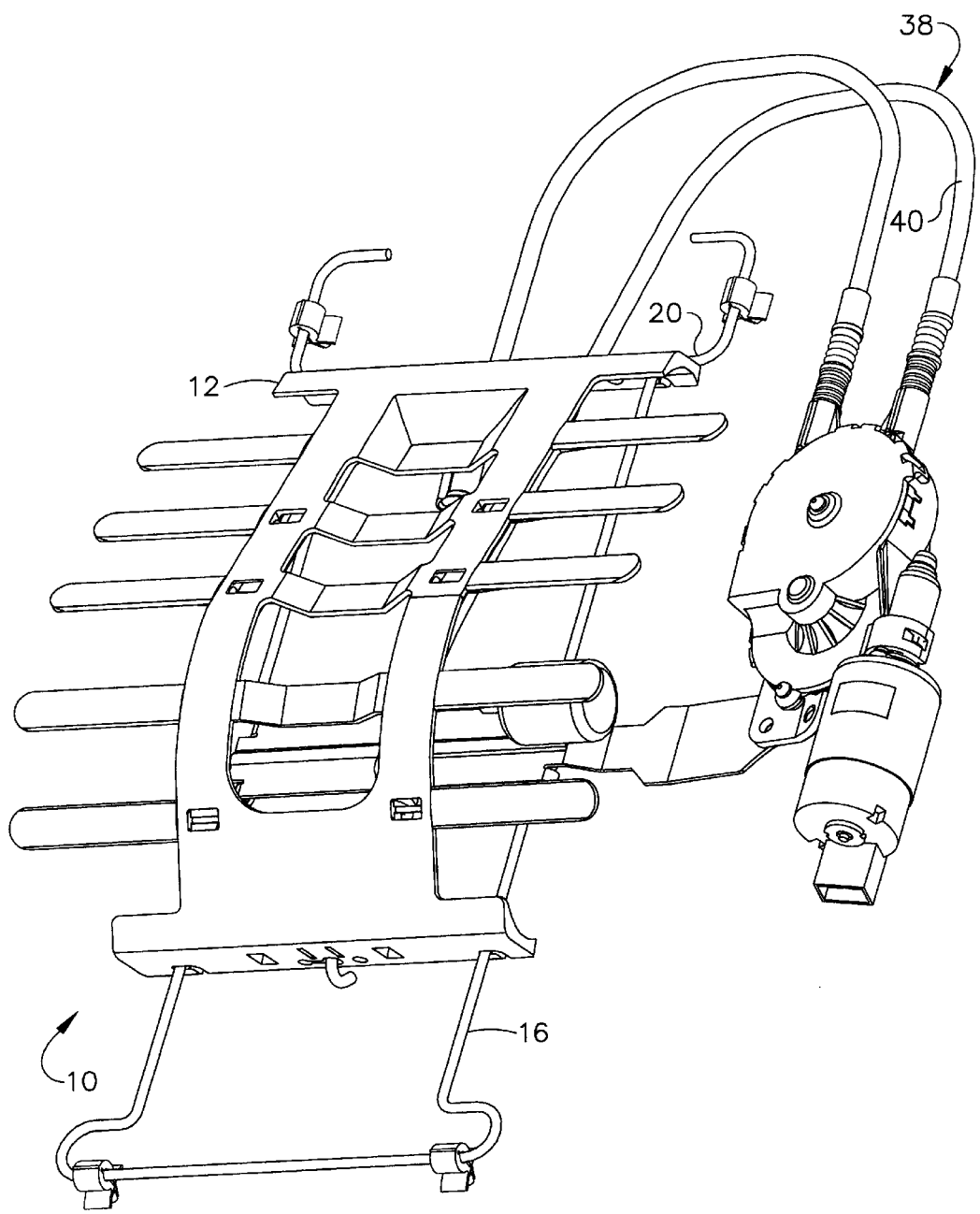
FIG. 15 is a perspective view of an alternative embodiment of the present invention, from the front, in its high arch position.

Conversely, traction on the second, bottom bowden cable, 38, draws the bottom, 14, of the archable pressure surface, 10, towards the central bracket, 24, where the bottom bowden cable wire, 42, is mounted. The top, 12, of the archable pressure surface, 10, is stopped by the top guide rail stop, 20, and continuing pressure on the bottom bowden cable, 38, pinches the archable pressure surface, 20, between the bottom bowden cable sleeve, 46, and the top guide rail stop, 20, again flexing the archable pressure surface, 10. This high arch position is shown in FIGS. 14 and 15, also depicting alternative bowden cable mounting.

The dimensions of the arch created by these motions are the same if either the top or bottom bowden cable are used to create it. If the top bowden cable, 30, is used to create the arch, the arch will be abutting the bottom guide rail stop, 22, and if the bottom bowden cable, 38, is used the arch will be abutting the top guide rail stop, 20. Accordingly, selecting which bowden cable is tensioned selects whether the arch is created in the upper position or the lower position. These positions may be separated by a range from 20 to 80 millimeters; for example, 56 millimeters separate the high and low apex in FIG. 2.

Figure 2:
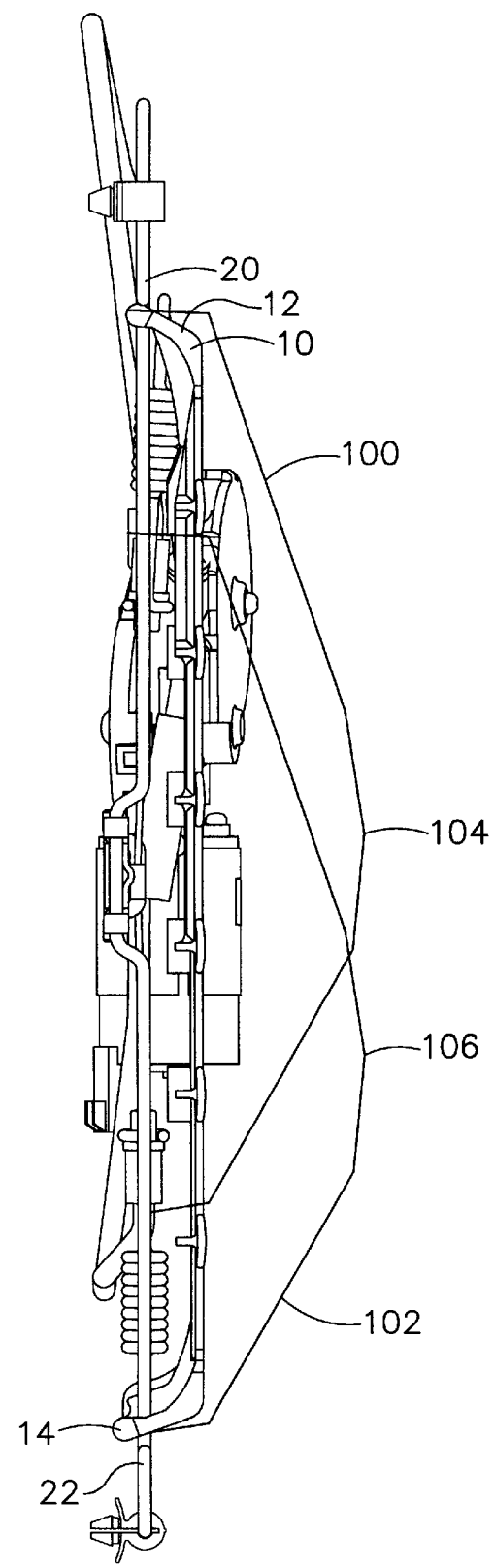
FIG. 2 is a side view of the lumbar support of the present invention.

FIG. 2 is a side view of the variable apex lumbar support of the present invention. Schematic lines, 100 and 102, illustrate the position of the archable pressure surface, 10, when fully arched. Line, 100, illustrates archable pressure surface arched in its top arch configuration, forming an apex at 104. Line 102 indicates the archable pressure surface, 10, lower arched configuration, forming an apex at 106. In the depicted alternative embodiment, the high arch apex, 104, is 56 millimeters higher than the low arch apex, 106. The travel between high and low apex positions is proportional to the amount of space between the archable pressure surface, 10, and guide rail end stops, 20 and 22. With the archable pressure surface, 10, in its high arch position, 100, the bottom end, 14, of archable pressure surface, 10, is nearly 56 millimeters from bottom guide stop, 22. When the archable pressure surface, 10, is in its low apex position, 102, the top end, 12, of the archable pressure surface, 10, is somewhat shorter than 56 millimeters from top guide rail end stop, 20.

Ergonomic studies have compared the lumbar anatomy of five foot tall persons to six foot tall persons and revealed that the lumbar vertebrae intended to be supported by a lumbar support do not vary vertically more than approximately 50 millimeters. Accordingly, the vertical travel of the apex of the lumbar support in the depicted embodiment is closely correlated to the range of varying lumbar support apex positions found to be most comfortable by seat occupants within the most common range of height.

As is best seen in FIG. 2, the pressure surface sliding ends, 12 and 14, are at an oblique angle to the plane of archable pressure surface, 10, in the flat position depicted in FIG. 2. This angle, between 90 and 180 degrees, is selected to maximize the horizontal travel of the apex of the arch created by archable pressure surface, 10, when traction is applied to it. Horizontal apex travel from flat to fully arched varies from about 10 to 50 millimeters in various models of lumbar supports. The described angled relationship of sliding ends, 12 and 14, to archable pressure surface, 10, increases horizontal apex travel by as much as 10 millimeters.

Figure 8:
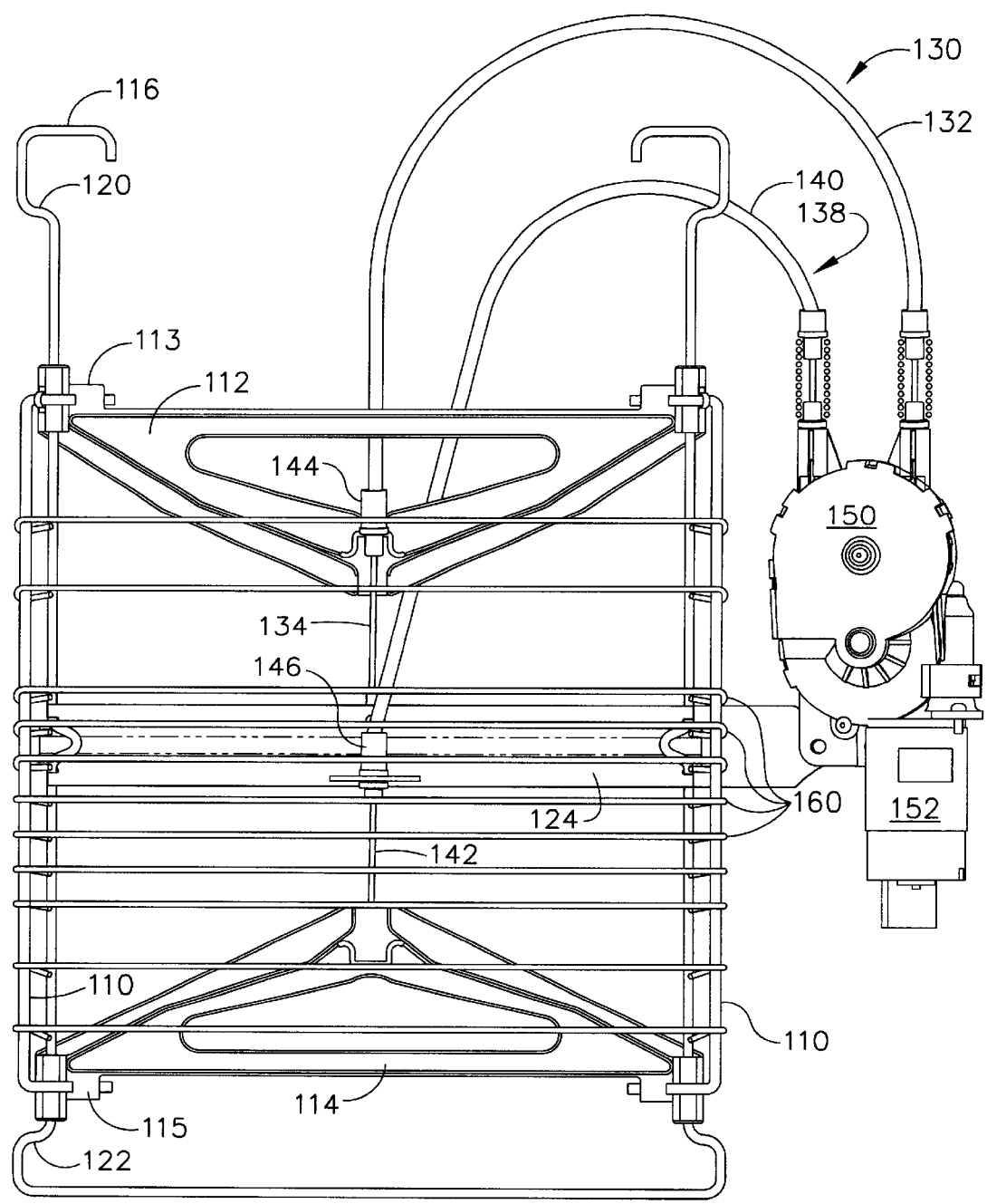
FIG. 8 is a back view of an alternative embodiment of the present invention.
Figure 9:
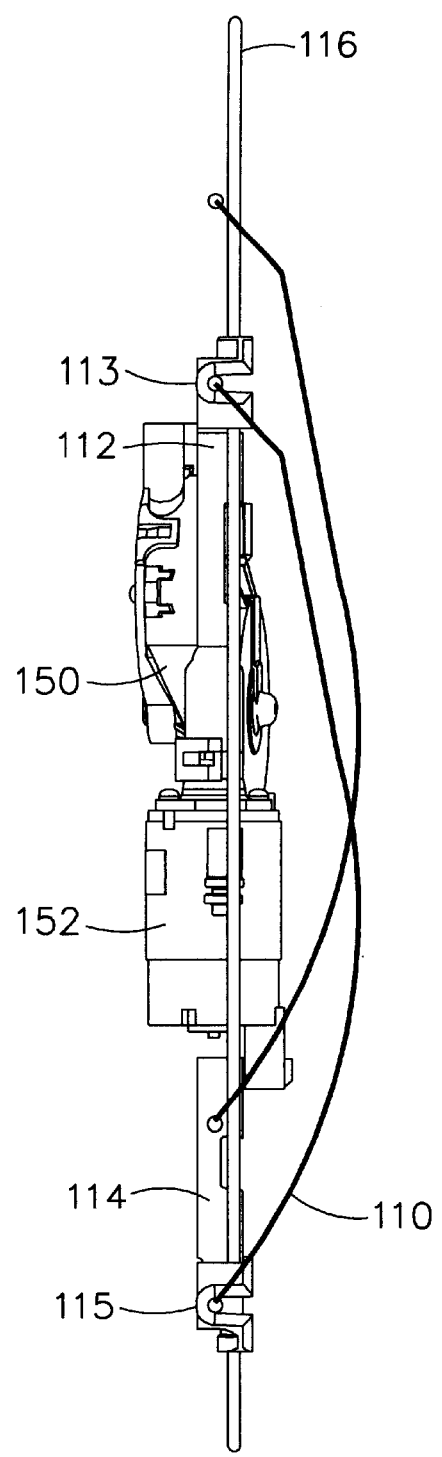
FIG. 9 is a side view of an alternative embodiment of the present invention.
Figure 10:
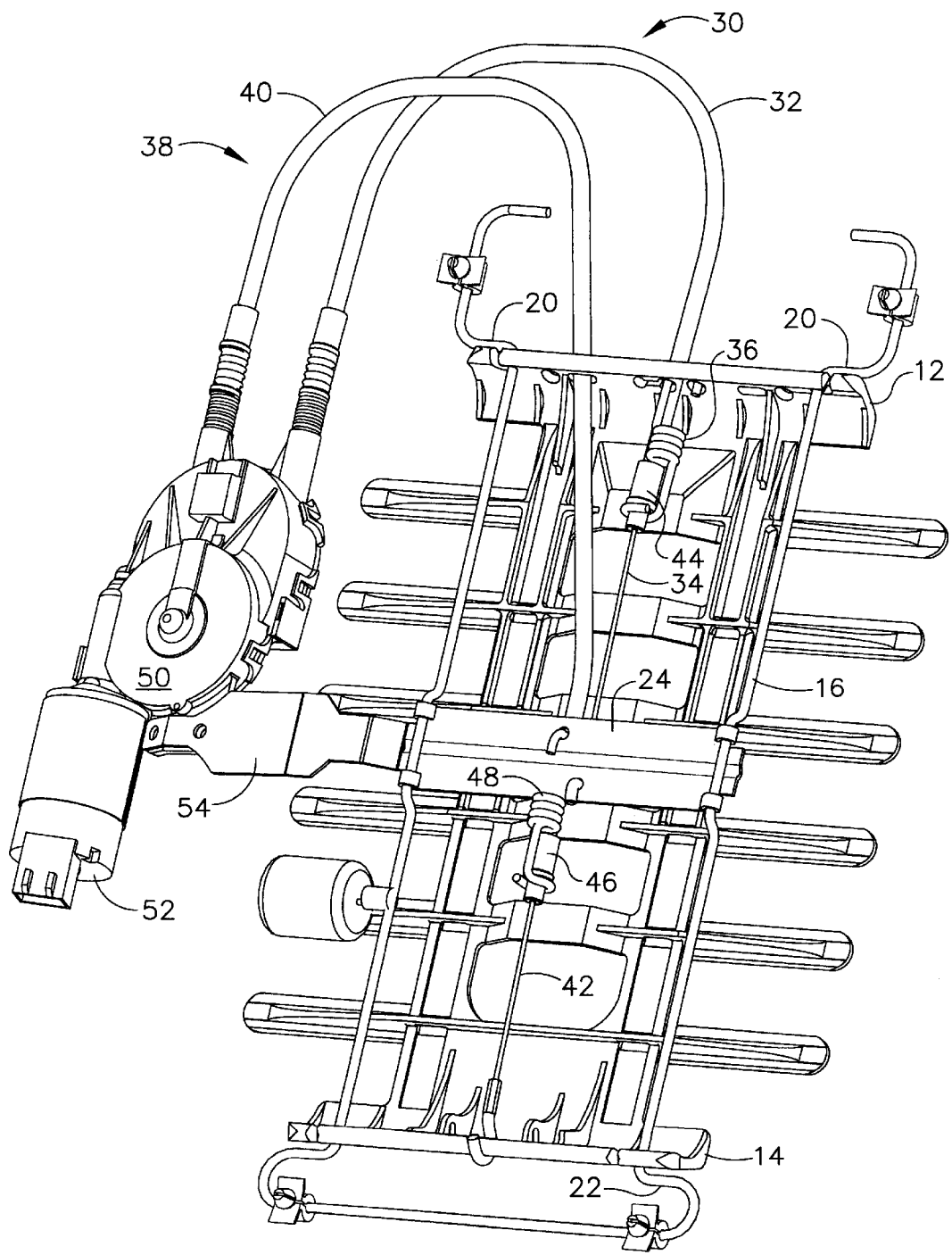
FIG. 10 is a perspective view of an alternative embodiment of the present invention, from the rear, in its flat position.

Of course equivalent alternatives include anchoring one or both bowden cable sleeves to the central bracket, 24, and mounting the corresponding one or both bowden cable wires to the end portions, 12 and 14, of archable pressure surface, 10. FIGS. 8, through 15 depict such a bowden cable sleeve and bowden cable wire attachment configuration. FIGS. 8 and 9 depict an alternative embodiment of the present invention using an alternative pressure surface. FIGS. 10 through 15 show the first pressure surface with the alternative bowden cable attachments. The bowden cable attachment configuration is equally applicable to all alternative embodiments. In FIGS. 8 through 15, first bowden cable, 130, and second bowden cable, 138, are both oriented towards the top of the lumbar support as they exit actuator housing, 150. First bowden cable sleeve, 132, is anchored at 144 to a top mounting bracket, 112. This mounting may also be had at top portion, 12, of an archable pressure surface, 10. Second bowden cable sleeve, 140, is anchored at 146 to the central mounting bracket, 124. The second bowden cable wire, 142, extends from the central bracket to the lower mounting bracket, 114, where it is also anchored. Since the bowden cable sleeve end and the bowden cable wire end act in unison to draw together whatever elements of the device are anchored to the sleeve end and wire end, the novel action of the present invention may be achieved with either bowden cable anchored in either configuration.

Figure 3:
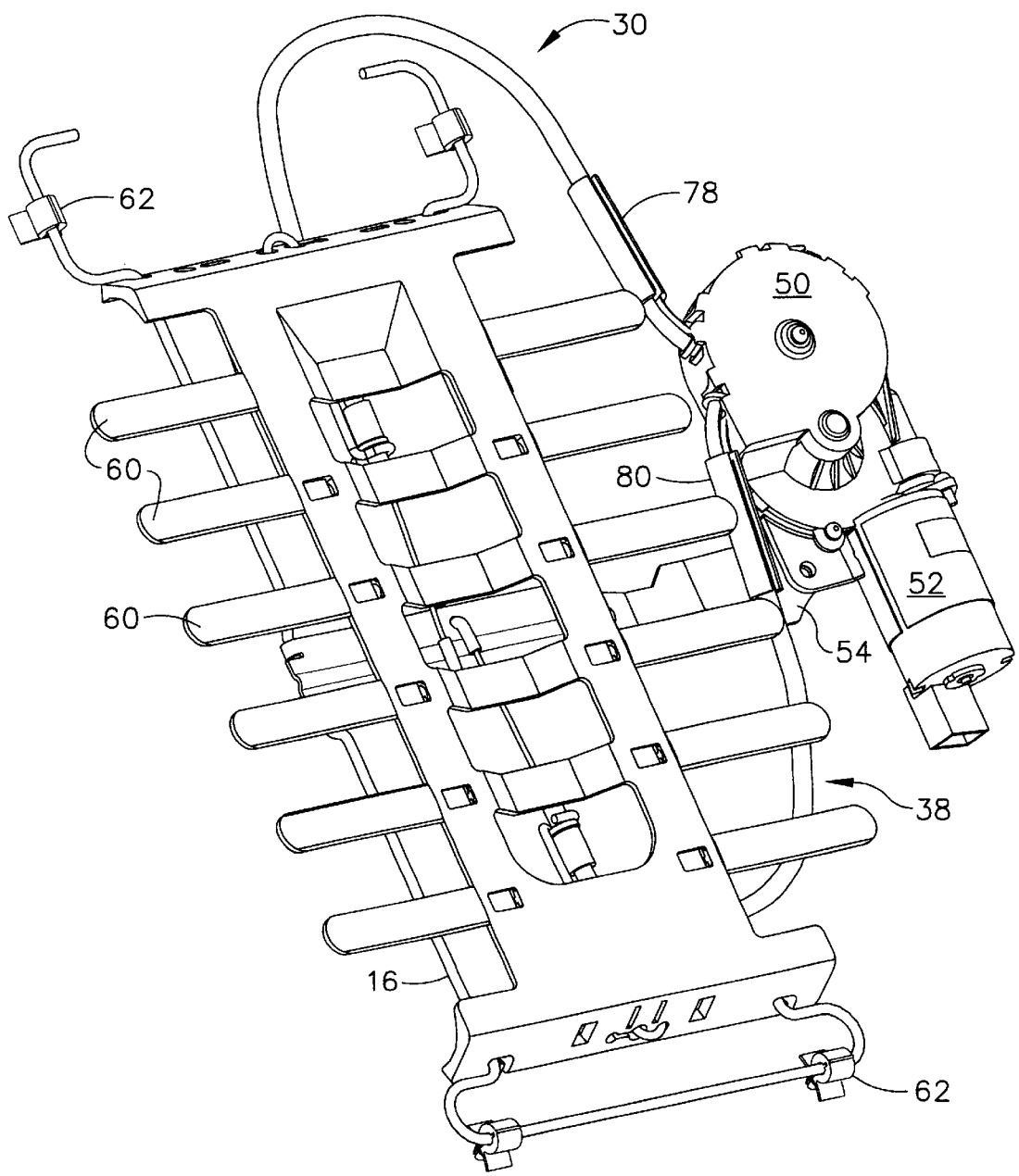
FIG. 3 is a perspective view of the lumbar support of the present invention viewed from the front.

Further features of the lumbar support of the present invention are indicated on FIG. 3. A rotating actuator, 50, engages bowden cables, 30 and 38, in order to put traction on the wires within them, as is more fully described below. The rotating action of actuator, 50, may be achieved by a variety of equivalent alternatives, such as hand wheels or levers. In the depicted alternative embodiment, the rotating actuator, 50, is driven by an electric motor, 52. The rotating actuator, 50, may be loose and mounted on the seat into which the lumbar support is installed, or, as in the depicted alternative embodiment, may be anchored to the lumbar support unit by bracket, 54, which extends laterally from its fixation to central bracket, 24. The unitized assembly of the depicted alternative embodiment eases packaging, shipping and installation of the lumbar support into a seat.

The archable pressure surface, 10, has a number of ribs or fingers, 60, to distribute the supporting area of the archable pressure surface. The guide wire, 16, has brackets, 62, on it for mounting the lumbar support into a variety of seats. Brackets, 62, may be used to mount the lumbar support on a flexible wire mat, a rigid frame, support wires or rods, sinuous wires or rigid seat frame brackets.

Figure 4:
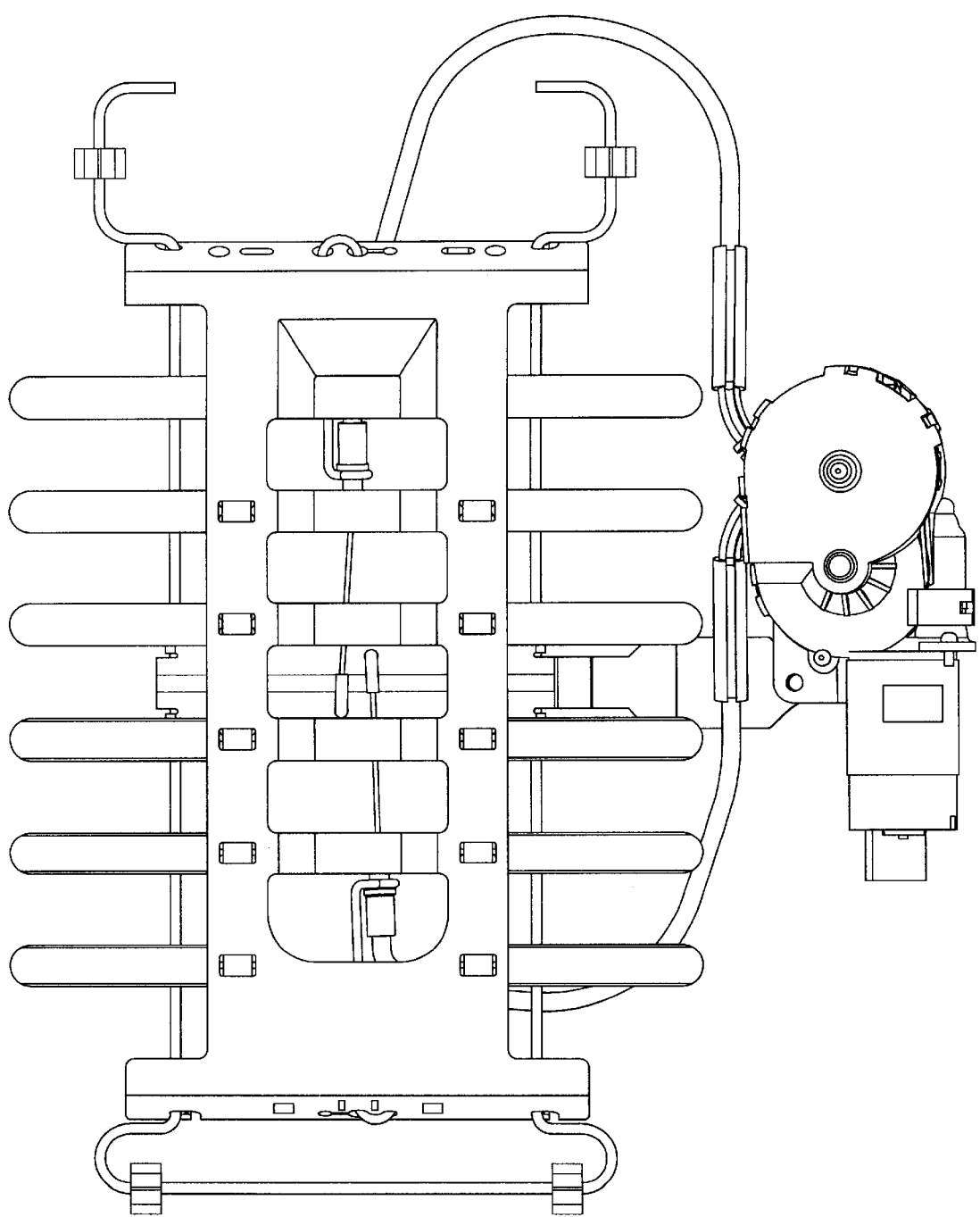
FIG. 4 is a front view of the lumbar support of the present invention.
Figure 5:
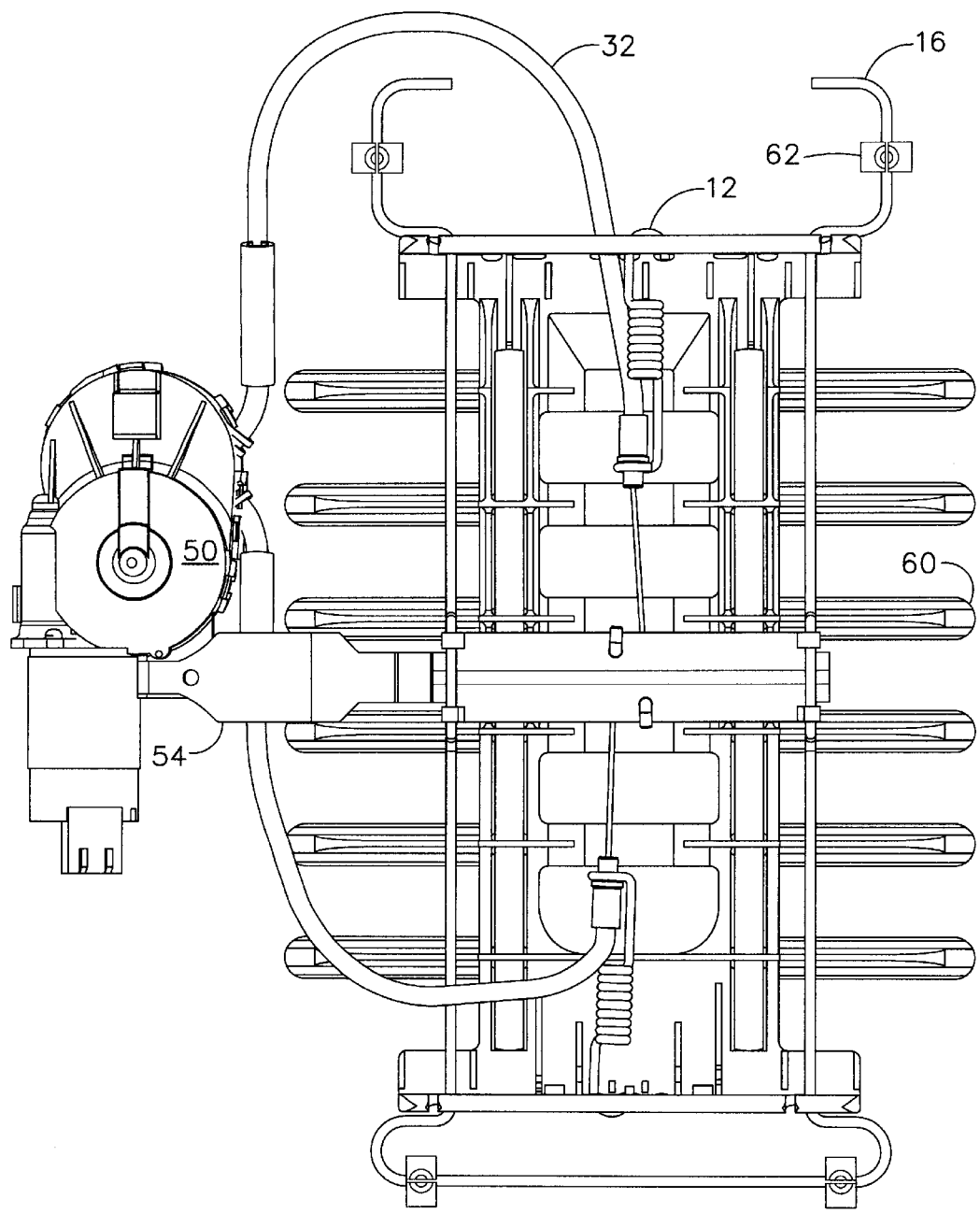
FIG. 5 is a rear view of the lumbar support of the present invention.

FIGS. 4 and 5 are front and rear views of the lumbar support of the present invention.

As is best seen in the rear view, FIG. 5, the depicted alternative embodiment has a central bracket for anchoring bowden cable wires. It is considered to be within the scope of the invention that the bowden cable wires (or bowden cable sleeve ends) may be anchored elsewhere, provided that one of the bowden cable's wire or sleeve end is in tractive communication with the upper portion of the archable pressure surface, and the other bowden cable wire end or sleeve end is anchored elsewhere on the lumbar support, off of the archable pressure surface. Selectively arching the pressure surface in a high apex position or a low apex position is by selectively drawing the lower portion upward towards the high guide rail stop or drawing the upper pressure surface portion down towards the low guide rail stop. This is considered to be within the scope of the present invention regardless of whether or not a central bracket is used for anchoring a traction element.

The Actuator

Tractive force is applied to both bowden cables through a single actuator. The ends of each bowden cable that are not attached to the archable pressure surface are attached to a wheel, 70, in the rotating actuator, 50, depicted in detail in FIGS. 6 and 7. Rotation of the wheel in one direction applies traction to one bowden cable, and rotation of the wheel in the opposite direction applies traction to the other bowden cable. Thus, at one extreme rotation of the actuator wheel, the pressure surface is fully flexed, fully drawn to the top end of the guide rail and maintains an apex in the top position. Full rotation of the actuator wheel in the opposite rotational direction forms the pressure surface arch on the opposite end of the guide rail. Travel from one actuator wheel extreme through a half-way point and to the other actuator wheel extreme reduces tractive force on one cable, moves through the half-way point where there is no tractive force on either cable and then applies an opposite tractive force on the opposite bowden cable. When the actuator wheel travels through the half-way point where there is no traction on either cable, the archable pressure surface is flat.

Figure 7:
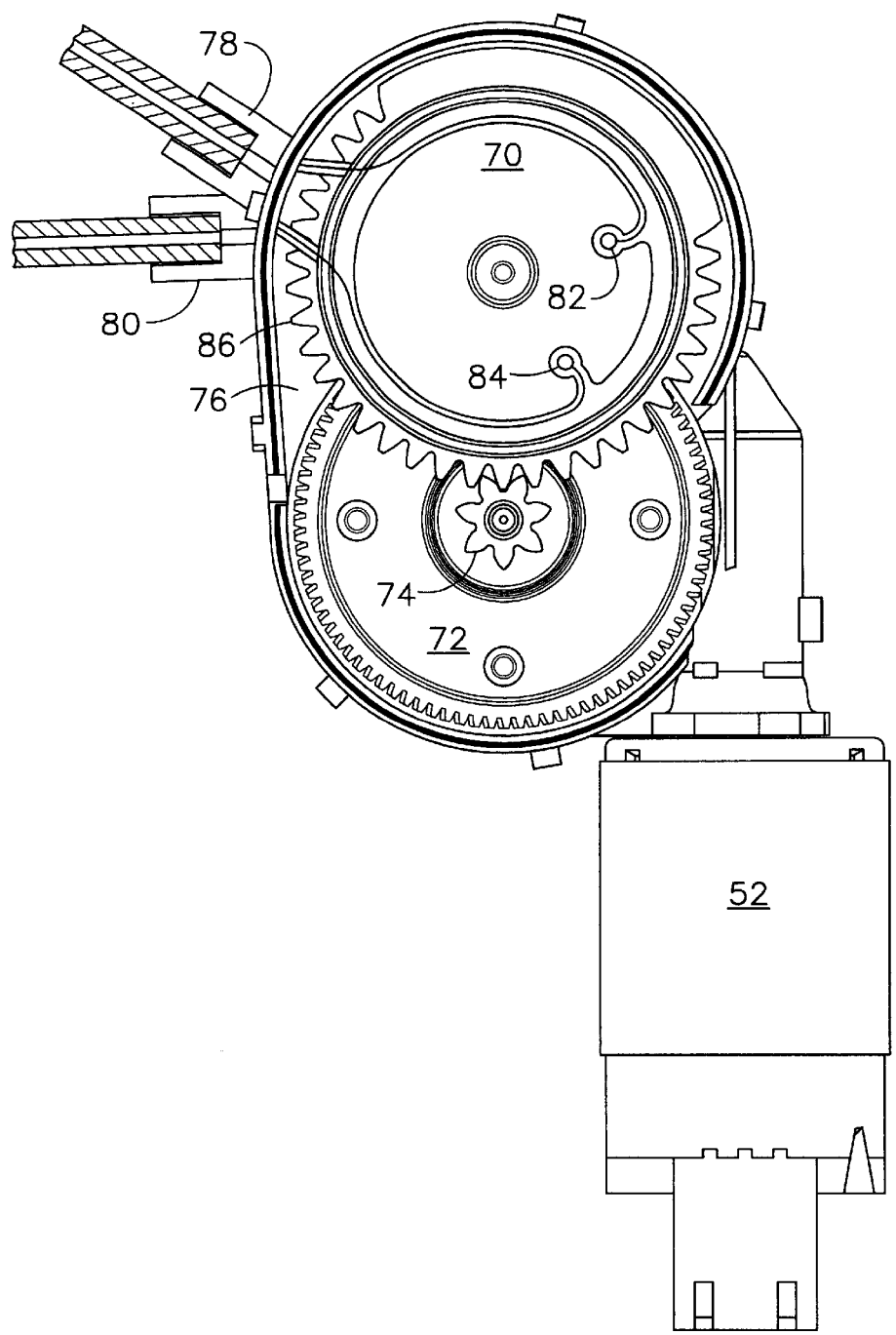
FIG. 7 is a cut-away top view of the rotating actuator of the present invention.

As seen in FIG. 7, housing, 76, encloses a drive wheel, 72, engaged to receive driving force from electric motor, 52. Relatively large drive wheel, 72, is fixedly attached to co-axial drive sprocket, 74. Drive wheel, 72, having a large radius relative to drive sprocket, 74, gives it mechanical advantage, allowing a smaller, more compact and less expensive motor, 52, to be used. Housing, 76, encloses drive wheel, 72, drive sprocket, 74, and actuating wheel, 70. Bowden cables, 30 and 38, enter housing, 76, through anchors, 78 and 80. The bowden cable sleeves, 32 and 40, are anchored at 78 and 80. The bowden cable wires, 34 and 42, enter through sleeves 32 and 40, through anchors 78 and 80, to where they engage with actuator wheel, 70. Wires, 34 and 42, are attached to actuator wheel, 70, at eyelets, 82 and 84. Each bowden cable wire, 34 and 42, wraps around actuator wheel, 70, in an opposite direction to reach their respective eyelets, 82 and 84. Actuator wheel, 70, has teeth, 86, which engage with the teeth of drive sprocket, 74. In the depicted alternative embodiment, drive sprocket, 74, has 7 teeth and actuator wheel, 70, has 28 teeth. The range of rotation for actuator wheel, 70, is 242 degrees. This corresponds to a total cable travel of 80 millimeters.

Other tooth ratios, rotation angles and travel lengths are within the scope of the invention. For example, a lever or handwheel can achieve 40 millimeters of horizontal apex travel from flat to fully arched with 120 degrees of rotation and 20 millimeters of cable travel. In this configuration, zero degrees would correspond to a fully arched apex in the low position, 60 degrees from that position would be the flat intermediate position and 120 degrees would correspond to a fully arched apex in the high position. Forty millimeters of in and out travel are achieved by centering the lever at the 60 degree position of the rotating actuator wheel so that 20 millimeters of travel towards the zero degree position achieves the low arch, while 20 millimeters of cable travel towards the 120 degree position achieves the high arch. Ratchet or overrunning clutch actuators, as are know in the art, may also be used. Substantially the same degree of apex horizontal travel can be achieved with substantially the same amount of cable travel in a ratchet actuator with 7 millimeters of travel per ratchet lever arm turn. Accordingly, three ratchets in one direction will achieve the high apex, while 3 ratchets from center in the opposite direction will achieve the low apex.

Figure 6A:
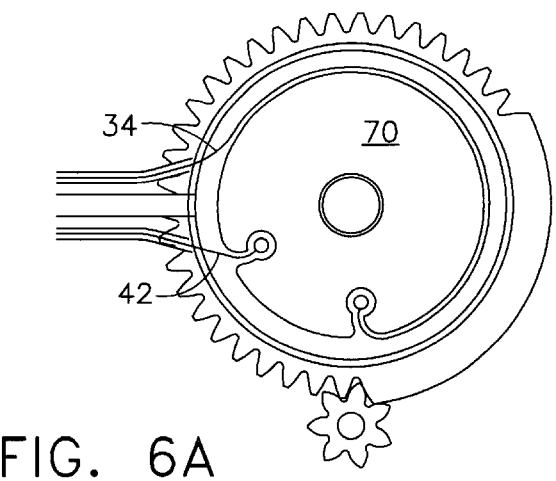
FIGS. 6A, 6B and 6C are schematic cut-aways of the rotating actuator of the present invention.
Figure 6B:
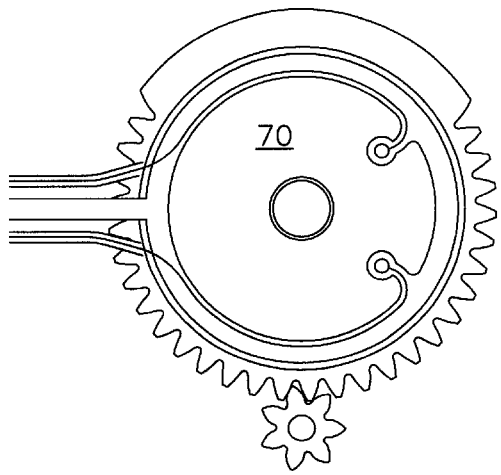
Figure 6C:
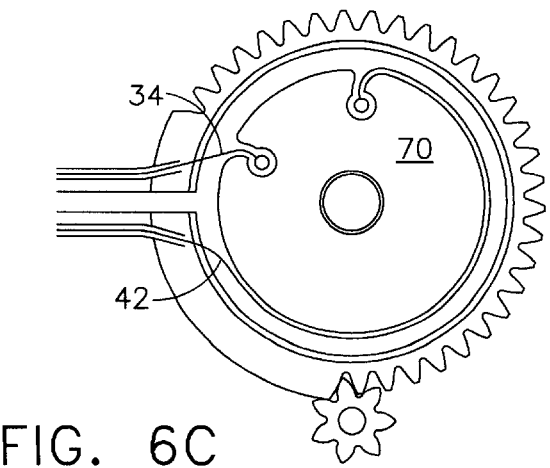

In operation, the full range of movement of the archable pressure surface from low arch through a middle flat position to high arch are controlled by the position of actuator wheel, 70, and the traction it exerts on bowden cable wires, 34 and 42. In FIG. 6A, actuator wheel, 70, is at its position corresponding to the archable pressure surface being fully arched in the low apex position. Lower bowden cable wire, 42, has no tractive force being exerted on it and is short relative to upper bowden cable wire, 34, in the portion of that wire depicted in FIG. 6A. Engagement of electric motor, 52, turns drive wheel, 72, which turns drive sprocket, 74, which turns actuator wheel, 70, counterclockwise towards and through the neutral position depicted in FIG. 6B. At this position there is no tractive force being exerted on either bowden cable wire and, accordingly, the archable pressure surface is flat. Continuing engagement of motor, 52, drives actuator wheel, 70, further counterclockwise. As actuator wheel, 70, proceeds in that direction, it begins to draw lower bowden cable wire, 42, out of its anchored sleeve, 40. This exerts the tractive force necessary to draw the archable pressure surface, 10, into its restraining engagement with guide wire top stop, 20. As actuator wheel, 70, continues to turn it exerts continuing tractive force on lower bowden cable wire, 42, which force is transferred to the archable pressure surface by drawing the end of bowden cable wire, 42, anchored to central bracket, 24, towards the bowden cable sleeve end, 46, which is anchored to the archable pressure surface lower end, 14, drawing it upwards. The upwards tractive force on bottom end, 14, arches the pressure surface, 10, in the manner described above. Continuing rotation of actuator wheel, 70, until its limit depicted in FIG. 6C puts the archable pressure surface, 10, into its upper arching position with the apex fully extended.

It is contemplated to be within the scope of the present invention that a single bowden cable can be used, with a single bowden cable wire. A first end of the wire is attached to the central bracket, and the second end is also attached to the central bracket, but from the other side. A centrally located crimp, pin, rack and pinion, lever or other fixation anchors a central portion of the single bowden cable wire to the actuator wheel for receiving tractive force selectively to one or the other sections of the single bowden cable wire for putting tension on the archable pressure surface with either the first or second end of the single bowden cable.

FIGS. 8 and 9 depict an alternative application of the present invention. Archable pressure surfaces may be fabricated out of metal or plastic into a ribbed assembly with engaging upper and lower ends as depicted in FIGS. 1 through 5 and 10 through 15. Archable pressure surfaces may also be fabricated of hinged flexing rods that support lateral wires. FIG. 8 is a front view of such a flexible wire mat type of arching lumbar support. Again there are guide rails, 116. Again the guide rails have top stops, 120, and lower stops, 122. In the depicted alternative embodiment, these are quite simply fabricated by bending the wire at the appropriate distance.

In the flexible wire mat alternative embodiment, the arching pressure surface is comprised of two flexible rods, 110. These rods support a plurality of lateral wires, 160.

The archable flexible rods, 110, are hingedly attached to an upper sliding bracket, 112, and a lower sliding bracket, 114. Brackets, 112 and 114, may be molded plastic or stamped metal. In either case, they are mounted to slide on guide rails, 116. Brackets, 112 and 114, also have a detent or hole, 113 and 115, for receiving a hinged insertion of the ends of arching pressure rods, 110. When traction is applied to draw upper bracket, 112, and lower bracket, 114, towards one another, the brackets, staying in the plane defined by guide rails, 116, slide towards one another along guide rails, 116. Simultaneously, the ends of arching pressure rods, 110, pivot in apertures, 113 and 115, allowing flexible rods, 110, to bow or arch outwards towards a seat occupant. Such an arch is depicted in side view, FIG. 9.

Guide rails, 116, support a non-moving central bracket, 124. Upper bowden cable, 130, has its sleeve, 132 mounted to bracket, 112, at sleeve end, 144. Upper bowden cable, 130, has a wire, 134, which extends out of sleeve, 132, to where its end is anchored to central bracket, 124. Lower bowden cable, 138, has its sleeve, 140, anchored to central bracket, 124, at sleeve end, 146. Lower bowden cable wire, 142, extends out of sleeve end, 146, to where the end of wire 142 is anchored to lower bracket, 114. The same actuator principle is used as above. Sleeve anchors 78 and 80 may be fixed, or pivot or slide. As described above, the actuator wheel and housing may vary with varying configurations of the lumbar support.

Motor, 152, drives actuator, 150, to selectively tension either upper bowden cable, 130, or lower bowden cable, 138. If upper bracket, 130, is selected, wire, 134, is drawn into sleeve, 132, moving upper bracket, 112, through traction at cable sleeve end, 144, to move closer to central bracket, 24. This causes pressure rods, 114, to bow outward creating an arch, since they cannot move downwards as the lower bracket, 114, is stopped by guide rail bottom stop, 122. Accordingly, an apex is formed in a low apex position by tensioning the upper bowden cable, 130. A upper apex is formed by a similar but converse operation of using the actuator, 150, to put tractive force on lower bowden cable wire, 142, through lower bowden cable sleeve, 140.

The cost savings of this invention are not only applicable to simple apex height variance, but may also be incorporated with more advanced features. More particularly, highly complex and expensive massage units are available for the luxury seat market. The present invention may be deployed to achieve a massaging effect at a reduced cost in the following manner.

Programmed microchip control of moving ergonomic supports may be integrated with the present invention. Programmed, cyclic motion patterns may be maintained for pre-configured time periods by integrating modules such as those disclosed in U.S. Pat. Nos. 5,816,653 and 6,007,151 with electric motor drive for the rotating actuator of the present invention. Such cyclic motion control microprocessor modules can take any electronically actuated lumbar support through its full mechanical range of positions, either continuously or intermittently, with or without pauses. Accordingly, it is within the scope of the present invention to incorporate such a cyclic motion pattern controlling microprocessor module. The control module would be fixedly attached to the actuator housing, electric motor assembly and wired to the electric motor for control of it. Assuming a full range of motion of the present invention is programmed into the module, the electric motor would periodically rotate the actuator wheel, 70, through any portion or all of its range. If the full range of motion is programmed into the module, from a starting position, the module would control the electric motor to rotate the actuator wheel through the range including the low apex position, through a rotation releasing tension on the upper bowden cable wire until the archable pressure surface is flat, then continue rotating the actuator wheel to apply tension to the lower bowden cable wire until continued traction on it forms the upper apex position.

Continuing motion of the archable pressure surface after rotation of the actuator wheel has proceeded to its mechanical limit requires turning the actuator wheel back in the opposite direction. This is achieved in a known manner by using, as equivalent alternatives, either stall sensors or position sensors combined with a memory of the position corresponding to the mechanical limits of the lumbar support. The position sensor may be placed at a variety of locations, for example, on the actuator wheel, along the bowden cable wire, or elsewhere. When the position pre-configured to correspond to the mechanical limit of the archable pressure surface indicates that a mechanical limit has been reached, the control module is pre-configured to reverse the direction of rotation of the actuating wheel. Alternatively, a stall sensor may be used. Appropriate stall sensors include without limitation amperage meters. When the electric motor current spikes, indicating that the motor has stalled due to a mechanical limit being reached, the control module may respond to the current spike by reversing the direction of the actuating wheel rotation.

Timers may be incorporated in the control module and pre-configured so that pauses in the cycling motion of the lumbar support may be maintained for any length of time. Hence movement of the archable pressure surface may be continuous, may proceed in a stepped fashion so that time intervals are so short and movement magnitudes between pauses are so small that individual movements and individual pauses are imperceptible to the seat occupant. Alternatively, perceptible amounts of movement and pauses of time may be pre-programmed. Finally, the time is pre-configured to cycle for a given amount of time, for example ten minutes, and then stop. Of course the seat occupant may stop the cycling motion by turning off a switch in control of the control module, turning off the automobile into which such a seat may be incorporated, or repositioning a set position of the archable pressure surface with a separate control.

It is further contemplated to be within the scope of the present invention that the variable apex lumbar support may be combined with other components in order to completely develop the advantages of the present invention. For example, the variable apex lumbar support of the present invention may be fitted with a vibrator such as an eccentric weight or a pulse magnet vibrator. When fitted with such a vibrator, such as at 100 on FIG. 11, the lumbar support of the present invention may impart a massage effect in any of its positions. Further, the vibrator can be combined with the microprocessor described above so that a more complex massage effect may be imparted to a seat occupant for a pre-configured amount of time. Such combination would allow alternation between the high and low apex on a continuing cycle while the entire unit vibrates, thereby further promoting the comfort of the seat occupant.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support with a variable apex comprising:
   at least one guide element adapted to be disposed within a seat, said guide element having an upper stop and a lower stop;
   a bowing element disposed to travel on said guide element, said bowing element having an upper portion and a lower portion;
   a first traction element operatively engaged to draw said upper portion of said bowing element toward said lower portion of said bowing element such that said lower portion of said bowing element is drawn into abutment with said lower stop and such that a first convexity is formed in said bowing element as said traction element continues to draw said upper portion of said bowing element further towards said lower stop; and
   a second traction element operatively engaged to draw said lower portion of said bowing element toward said upper portion of said bowing element such that said upper portion of said bowing element is drawn into abutment with said upper stop and such that a second convexity is formed in said bowing element as said traction element continues to draw said lower portion of said bowing element further towards said upper stop.

2. The lumbar support of claim 1 wherein said bowing element travels in a substantially vertical plane.

3. A lumbar support with an apex that travels vertically comprising:
   at least one guide element adapted to be disposed within a seat, said guide element having an upper stop and a lower stop;
   a bowing element disposed to travel on said guide element, said bowing element having an upper portion and a lower portion;
   a mount attached to said guide element between said upper stop and said lower stop; and
   at least one traction element operatively engaged to draw one of said upper portion or said lower portion of said bowing element toward said mount such that the other of said upper portion or said lower portion of said bowing element is drawn into abutment with one of said upper stop or said lower stop and such that a convexity is formed in said bowing element as said traction element continues to draw one of said upper portion or said lower portion further towards said mount.

4. The lumbar support of claim 3 wherein said bowing element travels in a substantially vertical plane.

5. A lumbar support with variable apex height comprising:
- at least one guide rail having a top stop and a bottom stop and having a central bracket;
- an archable pressure surface slidingly disposed on said guide rail, said archable pressure surface having an upper portion and a lower portion, said upper portion and lower portion being closer together than said top stop and said bottom stop of said guide rail when said archable pressure surface is arched;
- a first bowden cable having a first sleeve anchored to said one of said upper portion or said lower portion of said archable pressure surface and said first bowden cable having a first wire slidingly disposed within said first sleeve, said first wire being anchored to said central bracket of said guide rail such that when said first wire of said first bowden cable is drawn into said first sleeve of said first bowden cable, a downward traction on said archable pressure surface is stopped by said bottom stop of said guide rail and a low arch is formed; and
- a second bowden cable having a second sleeve anchored to said central bracket of said guide rail and said second bowden cable having a second wire slidingly disposed within said second sleeve, said second wire being anchored to the other of said lower portion or said upper portion of said archable pressure surface such that when said second wire is drawn into said second sleeve of said second bowden cable, an upward traction on said archable pressure surface is stopped by said top stop of said guide rail and a high arch is formed.

6. The lumbar support of claim 5 wherein at least one of said bowden cable wires are anchored via a spring to one of said central bracket of said guide rail or said archable pressure surface.

7. The lumbar support of claim 5 wherein at least one of said bowden cable sleeves are anchored via a spring to one of said central bracket of said guide rail or said archable pressure surface.

8. The lumbar support of claim 5 wherein said first bowden cable and said second bowden cable are opposing ends of a single bowden cable.

9. The lumbar support of claim 5 further comprising an actuator being engaged with said first bowden cable and said actuator being engaged with said second bowden cable such that activation of said actuator in a first direction draws said first wire into said first sleeve and activation of said actuator in a second direction draws said second wire into said second sleeve.

10. The lumbar support of claim 9 wherein said actuator is a rotating actuator and said activation is rotation.

11. The lumbar support of claim 9 wherein said actuator is activated by an electric motor.

12. The lumbar support of claim 5 further comprising a vibrator.

13. The lumbar support of claim 5 further comprising:
- a processor operatively engaged to control an electric motor, said processor being programmed to
  - automatically draw said first wire into said first sleeve of said first bowden cable, such that a downward traction on said archable pressure surface is stopped by said bottom stop of said guide rail and a low arch is formed and
  - then draw said second wire into said second sleeve of said second bowden cable, such that an upward traction on said archable pressure surface is stopped by said top stop of said guide rail and a high arch is formed.

14. The lumbar support of claim 13 wherein said processor is further programmed to repeat said automatic drawing of said first bowden cable and said second bowden cable, said repetition continuing for a pre-configured time.

15. A lumbar support with variable apex height comprising:
- at least one guide rail having a top stop and a bottom stop and having a central bracket;
- an archable pressure surface slidingly disposed on said guide rail, said archable pressure surface having an upper portion and a lower portion, said upper portion and lower portion being closer together than said top stop and said bottom stop of said guide rail when said archable pressure surface is arched;
- a first bowden cable having a first sleeve anchored to said upper portion or said lower portion of said archable pressure surface and said first bowden cable having a first wire slidingly disposed within said first sleeve, said first wire being anchored to said central bracket of said guide rail such that when said first wire of said first bowden cable is drawn into said first sleeve of said first bowden cable, a downward traction on said archable pressure surface is stopped by said bottom stop of said guide rail and a low arch is formed; and
- a second bowden cable having a second sleeve anchored to said central bracket of said guide rail and said second bowden cable having a second wire slidingly disposed within said second sleeve, said second wire being anchored to the other of said lower portion or said upper portion of said archable pressure surface such that when said second wire is drawn into said second sleeve of said second bowden cable, an upward traction on said archable pressure surface is stopped by said top stop of said guide rail and a high arch is formed;
- an actuator housing anchoring each of said first and second sleeves of said first and second bowden cables;
- an actuator wheel disposed within said actuator housing, said actuator wheel being operatively engaged to each of said first and second wires of said first and second bowden cables such that rotation of said actuator wheel in a first direction draws said first wire into said first sleeve of said first bowden cable, and rotation of said actuator wheel in a second direction draws said second wire into said second sleeve of said second bowden cable;
- an electric motor operatively engaged to said actuator wheel; and
- a processor operatively engaged to control said electric motor, said processor being programmed to automatically draw said first wire into said first sleeve of said first bowden cable, such that a downward traction on said archable pressure surface is stopped by said bottom stop of said guide rail and a low arch is formed and then draw said second wire into said second sleeve of said second bowden cable, such that an upward traction on said archable pressure surface is stopped by said top stop of said guide rail and a high arch is formed.

* * * * *

UNITED STATES PATENT AND TRADEMARK OFFICE
CERTIFICATE OF CORRECTION

PATENT NO. : 6,652,028 B2
DATED : November 25, 2003
INVENTOR(S) : Robert McMillen It is certified that error appears in the above-identified patent and that said Letters Patent is hereby corrected as shown below:

Column 11,
Line 17, "said" should be removed

Signed and Sealed this

Twenty-seventh Day of July, 2004

JON W. DUDAS
*Acting Director of the United States Patent and Trademark Office*